United States Patent
Charles et al.

(10) Patent No.: US 7,023,163 B2
(45) Date of Patent: Apr. 4, 2006

(54) FAIL-SAFE ELECTRIC ACTUATOR USING HIGH VOLTAGE CAPACITORS

(75) Inventors: Donald E. Charles, Wauconda, IL (US); Matthew D. Cook, Lake Villa, IL (US)

(73) Assignee: Siemens Building Technologies, Buffalo Grove, IL (US)

( * ) Notice: Subject to any disclaimer, the term of this patent is extended or adjusted under 35 U.S.C. 154(b) by 79 days.

(21) Appl. No.: 10/992,863

(22) Filed: Nov. 19, 2004

(65) Prior Publication Data

US 2005/0127854 A1    Jun. 16, 2005

Related U.S. Application Data

(60) Provisional application No. 60/523,573, filed on Nov. 20, 2003.

(51) Int. Cl.
*G05B 9/02*    (2006.01)
(52) U.S. Cl. ..................................................... 318/563
(58) Field of Classification Search ............... 318/504, 318/563; 324/500, 511; 323/299
See application file for complete search history.

(56) References Cited

U.S. PATENT DOCUMENTS

| | | | |
|---|---|---|---|
| 5,278,454 A | | 1/1994 | Strauss et al. ................ 307/64 |
| 5,519,295 A | | 5/1996 | Jatnieks ..................... 318/453 |
| 5,737,144 A | * | 4/1998 | Ataee et al. .................. 360/75 |
| 5,744,923 A | | 4/1998 | Strauss et al. .............. 318/563 |
| 5,852,333 A | * | 12/1998 | Strojny et al. ................ 307/87 |
| 6,016,234 A | * | 1/2000 | Blank et al. .................. 360/75 |
| 6,051,948 A | | 4/2000 | Vepy .......................... 318/626 |
| 6,100,655 A | | 8/2000 | McIntosh .................... 318/159 |
| 6,133,714 A | * | 10/2000 | Hoffmann et al. .......... 320/166 |
| 6,563,252 B1 | * | 5/2003 | Schrod .................. 310/316.03 |

* cited by examiner

*Primary Examiner*—Bentsu Ro

(57) ABSTRACT

According to the present invention, a fail-safe circuit for controlling an actuator is provided with an input voltage which is rectified and converted to a DC voltage. The DC voltage is boosted to a high level, and high voltage storage capacitors are charged at this high voltage level resulting in smaller, less expensive capacitors. The high voltage from the storage capacitors is then converted back to a smaller DC voltage to drive the motor of the actuator. Reduced size and increased energy storage is based on the relationship between capacitance and voltage in the equation: $E = \frac{1}{2} CV^2$.

12 Claims, 6 Drawing Sheets

FAIL-SAFE ELECTRIC ACTUATOR USING HIGH VOLTAGE CAPACITORS

This application claims the benefit of U.S. Provisional Patent Application Ser. No. 60/523,573 filed Nov. 20, 2003, which is incorporated herein by reference.

FIELD OF THE INVENTION

The present invention relates generally to heating, ventilation and air conditioning (HVAC) systems, and more particularly, to a control circuit for a fail-safe actuator provided with high voltage energy storage capacitors for positioning a valve using an actuator in the event of a power failure.

BACKGROUND OF THE INVENTION

HVAC systems for use in buildings incorporate electric actuators to control the position of devices such as dampers and valves. In certain applications it would be advantageous to position a valve, open, closed or mid-position by means of an independent actuator in the event of a power failure. This type of valve actuator would be termed fail-safe. Several methods could be used to store the energy required to position the valve in a desired position in the event of a power failure include a mechanical spring, a battery and electric motor combination, or a capacitor and motor combination, which is the subject of the present invention. The use of an electric motor provides the capability to position the actuator open, closed or mid-position and would be easily configurable in the field. Mechanical spring solutions would provide open or closed positioning depending on the design, but would provide no capability for stopping at mid-position or field programmability. A battery would provide the necessary power at the cost of extra complexity. Battery voltage must be monitored to provide an indication if the battery had sufficient capacity to drive the valve to the desired position. Batteries must also be recharged on a continual basis. If the battery was for some reason not functional, a signal would have to be sent to a control panel otherwise the actuator would no longer be deemed fail-safe. In low current draw/standby applications, possibly operating at elevated temperatures, a battery has limited life. The cost of the battery, and lower to replace it, makes the battery solution cost prohibitive.

A better solution would be to store energy in a capacitor. A capacitor has a longer life, is relatively unaffected by temperature, and requires no special charging/monitoring circuit. The drawback would be the size and cost of a capacitor large enough to store the energy required to power the actuator in fail-safe circumstances.

SUMMARY OF THE INVENTION

According to the present invention, a fail-safe circuit for controlling a valve actuator is provided with an input voltage which is rectified and converted to a DC voltage. High voltage storage capacitors are charged at a high voltage, 300V in one embodiment, resulting in smaller, less expensive capacitors, and then converted back to 24VDC to drive the motor of the actuator. Reduced size and increased energy storage is based on the relationship between capacitance and voltage in the equation: $E = \frac{1}{2} CV^2$. (10 times voltage => 100 times energy). The conversion up is accomplished by a boost converter and the conversion back from the high voltage at which the capacitors store voltage down to a voltage level usage by the motor used for returning a device to a predetermined position in the case of a power failure is accomplished using a flyback converter. The fail-safe functionality is achieved by operating the motor from the high voltage capacitors.

DETAILED DESCRIPTION

Figure 1:
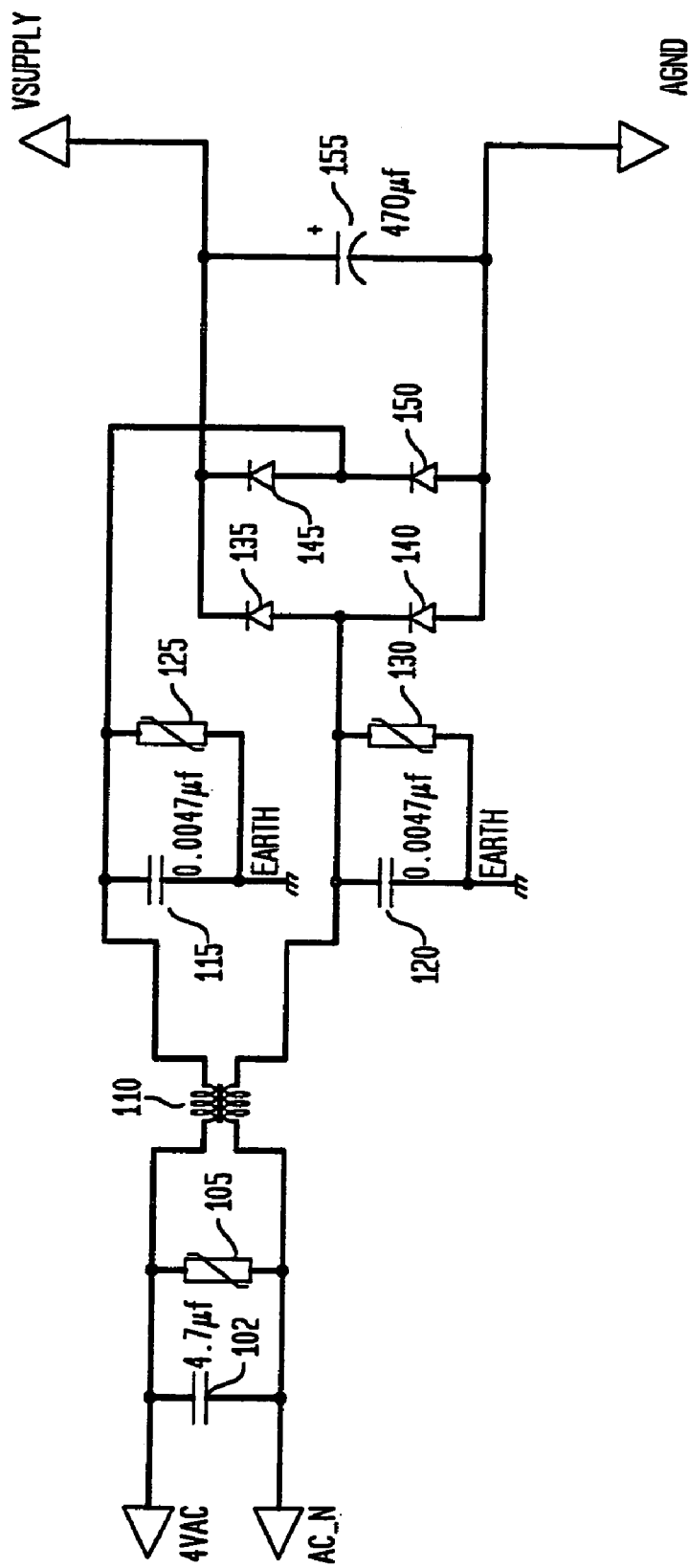
FIG. 1 is a circuit schematic showing how an AC input voltage is rectified.

FIGS. 1–6 show an electric actuator return-to-normal failsafe system according to an embodiment of the present invention. The purpose of the fail-safe system is to provide a source of power and directional control which enables a motor discussed to be driven to a predetermined position when electric power is lost or removed so as to position a device such as an valve or a damper in a desirable position when power is lost. Turning now to FIG. 1, FIG. 1 is a conditioning circuit to convert an AC power source into a DC supply for a motor. The circuit 100 includes a capacitor 102 provided for EMI filtering to keep noise from affecting the 24V input voltage. In one embodiment, capacitor 102 is a 0.047 microfarad capacitor. Metal oxide varistor 105 is provided to reduce voltage surges into circuit 100. Choke 110 is provided as a common mode choke, and is provided as part of the filter network comprised of capacitors 115, 120 and metal oxide varistors 125, 130. Circuit 100 is further comprised of a bridge rectifier 132 comprised of diodes 135, 140, 145 and 150. The purpose of the bridge rectifier circuit 132 is to turn the AC input voltage into input circuit 100 and convert it into DC voltage which will be the resulting Vsupply voltage for FIG. 3 discussed below. Capacitor 155 is provided as a filter for the bridge rectifier circuit 132 to reduce any ripple in the resulting Vsupply voltage coming out of circuit 100.

Figure 2:
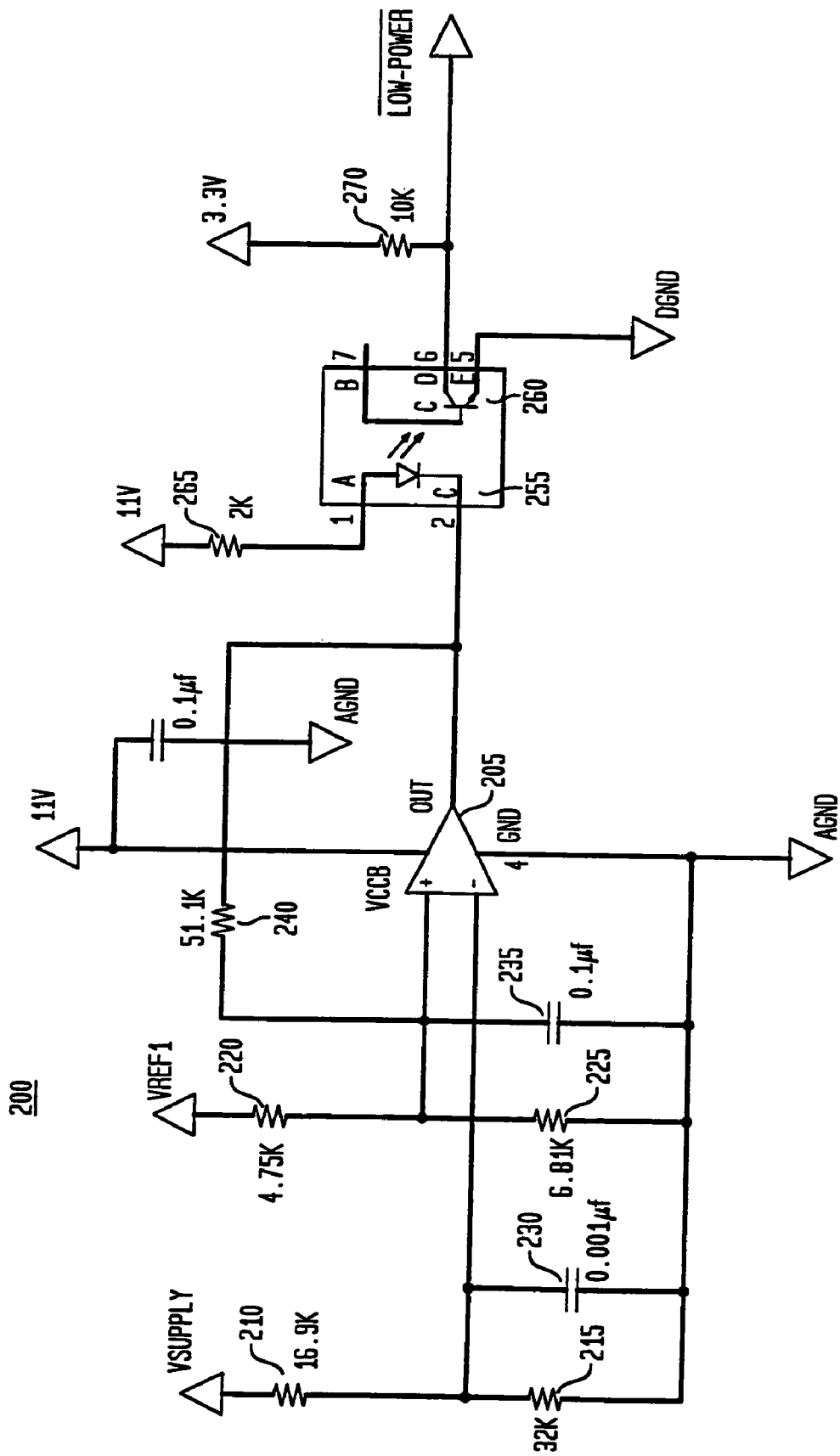
FIG. 2 is a circuit schematic showing how a low voltage signal is detected indicating a potential power failure.

FIG. 2 is a schematic diagram of a power-fail detect circuit 200. Circuit 200 is comprised of a voltage comparator 205 which is provided to compare the supply voltage Vsupply from the circuit shown in FIG. 1 coming into the comparator 205 with a predetermined reference voltage. When the supply voltage Vsupply drops below the reference voltage, a signal is sent to a control circuit shown in FIG. 6 below which is provided to turn on or turn off the actuator. Resistors 210 and 215 form a voltage divider for the supply voltage Vsupply. Circuit 200 compares the supply voltage Vsupply to a reference voltage which is divided by resistors 220 and 225. Capacitors 230 and 235 are provided for filtering. Resistor 240 is provided to provide hysteresis for the comparator 205 so it does not oscillate. Capacitor 245 is provided as a bypass capacitor for the comparator 205. When Vsupply drops below a predetermined reference voltage, the comparator 205 sends a signal to opto-isolator 250, which provides an open collector output, comprised of LED 255 and transistor 260. When Vsupply drops below the reference voltage, the comparator 205 sends a signal that turns LED 255 on, which in turn turns on transistor 260, such that a low power signal is sent to control circuit shown in FIG. 6 to turn off the motor. Resistor 265 is provided to limit the current through the diode 255 of the opto-isolator 250. Resistor 270 is provided as a pull-up resistor for transistor 260. FIG. 2 shows the voltage value coming into resistor 270 to be 3.3V, but this value can vary depending upon the voltage required by a processor. When the value of the voltage divider provided by resistors 210 and 215 is below the reference voltage provided by resistors 220 and 225, the comparator 205 knows the circuit is at low power. The comparator 205 compares the reference voltage to the input voltage, and when it is low, it sends this low power signal to the control circuit shown in FIG. 6, which would then turn on or off the actuator.

Figure 3:
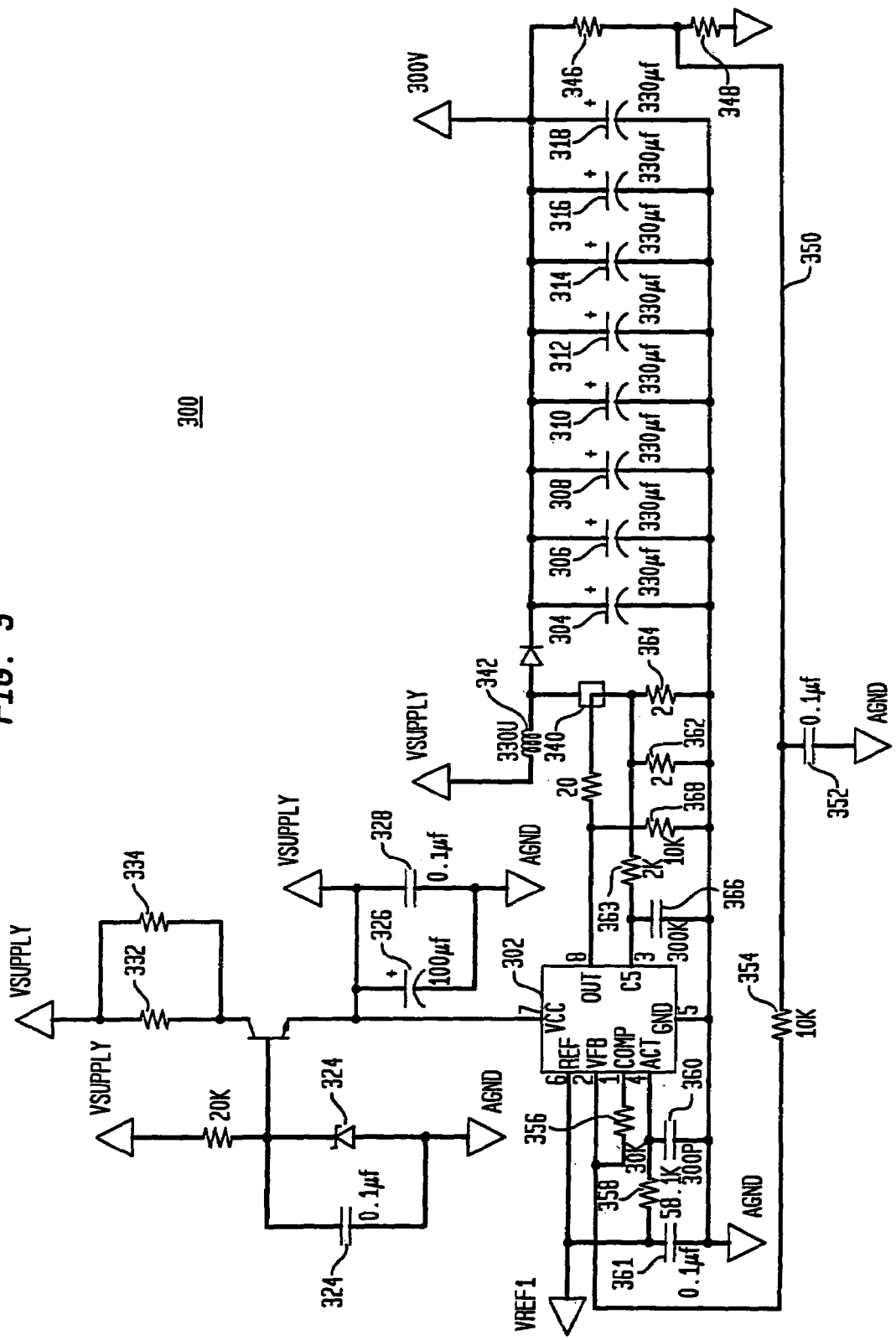
FIG. 3 is a circuit schematic showing how the rectified voltage signal from FIG. 1 is boosted a higher voltage and stored in a capacitor bank.

FIG. 3 is a schematic diagram of the boost converter circuit 300 provided with a pulse width modulator regulator 302. The purpose of circuit 300 is to take the Vsupply voltage and convert it up to 300V, and then store this energy in capacitors 304–318. Circuit 320 is provided to power the regulator 302. Circuit 320 is provided with an emitter-follower transistor 322 and a zener diode 324. Zener diode 324 establishes a voltage and the transistor 322 is essentially a diode drop away in value. Circuit 320 is provided with an 11V power source to power the regulator 302. Capacitors 326 and 328 provide the circuit 320 with filtering for the 11V power source. Capacitor 330 is provided to filter the voltage across zener diode 324. Resistor 335 limits current through zener diode 324. Resistors 332, and 334 provide current limiting for the transistor 322.

Turning now to the performance of the regulator 302, regulator 302 is provided to turn on and off the transistor 340. Transistor 340 may be any type of transistor known in the art, but is preferably a MOSFET. By turning transistor 340 on or off energy may be stored in inductor 342. When transistor 340 is turned off, energy is conducted through diode 344 into the storage capacitors 304–318. Storage capacitors 304–318 are preferably 330 uF capacitors. However, one of ordinary skill in the art will understand that capacitors having larger or smaller values may be used instead of 330 uF, which the understanding that the capacitance value selected should be such that smaller capacitors charged at a high voltage can be used to replace larger, more expensive capacitors that are commonly used in the art.

The energy, in joules, stored in the capacitors 304–318 is given by the equation $E=\frac{1}{2} CV^2$. As shown in the equation, energy is a square function of the voltage, but only a linear function of the capacitance. The electric motor draws a given current at a given voltage (Watts) for a given time (Watt seconds or Joules). In other applications, using a capacitor, if more power is required for a longer time (more Joules), the capacitance is simply increased. For example, four times the capacitance would result in four times the stored energy. This results in greater cost and increased size. The present invention seeks to increase energy by instead increasing voltage, since energy increases as a square of voltage. The circuit in FIG. 3 provides about a twelve fold increase in energy when 24V are converted up to 300V, so the circuit is effectively providing a 144 fold increase in energy.

Resistors 346 and 348 are provided as voltage dividers for the 300V input in circuit 300. The voltage through the voltage dividers 346 and 348 is brought through a feedback path 350. Capacitor 352 is provided to filter the voltage on the feedback path 350. By changing the on time and the off time of transistor 340, the amount of energy stored in the inductor 342 is changed, and by changing the amount of energy stored in inductor 342, the voltage on the storage capacitors 304–318 can be controlled.

The gain of the difference amplifier in circuit 300 is established by resistors 354 and 356. Resistor 356 defines the gain of the amplifier and the regulator 302. So as voltage across the storage capacitors 304-318 increases, resistors 346 and 348 divide it, increased voltage comes back through feedback path 350 and it limits the regulator 302 that controls the transistor 340. The clock of the regulator 302 preferably runs at a rate from 20 to 100 kHz that is defined by resistor 358 and capacitor 360. Capacitor 361 is provided for filtering. Regulator 302 is preferably a current mode PWM chip, so in addition to sensing the voltage coming back through resistors 346 and 348, current is sensed through transistor 340. Since the current through inductor 342 can't change instantaneously, a voltage is developed across resistors 362 and 364 that is proportional to the current through inductor 342. When that current through inductor 342 gets up to a predetermined level, the regulator 302 terminates the cycle. In this way if there are any faults in the circuit 300 transistor 340 is not destroyed. Accordingly, as is common with current mode controllers, a current feedback loop and a voltage feedback loop is provided. Resistor 363 and capacitor 366 is provided for filtering, to keep noise out of the regulator 302. Resistor 368 is provided to make the circuit more reliable and to turn transistor 340 off.

Figure 4:
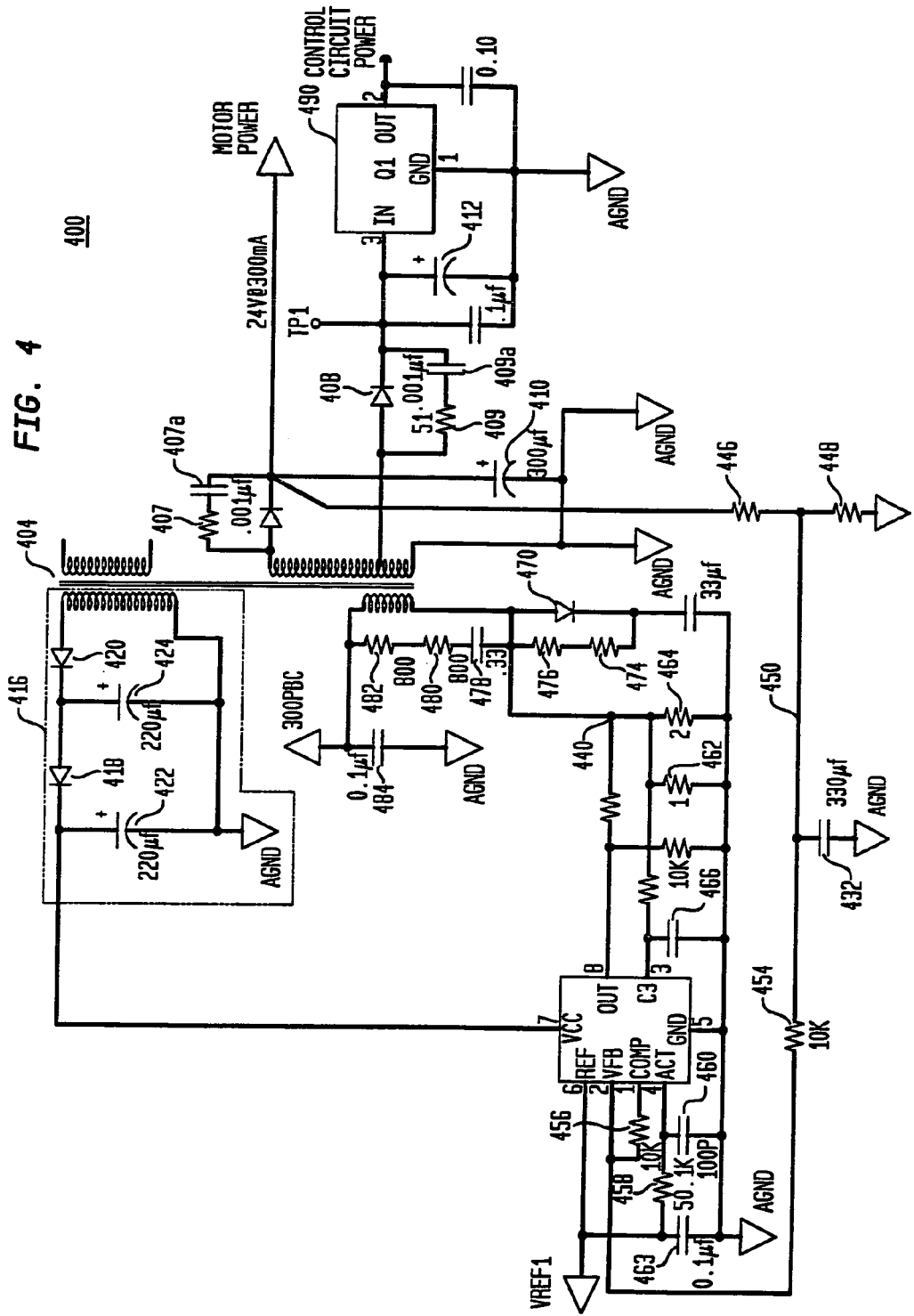
FIG. 4 is a circuit schematic showing how the higher voltage energy stored in the capacitor bank shown in FIG. 3 is converted down to lower voltages to be applied to a control circuit and a motor drive circuit.
Figure 6:
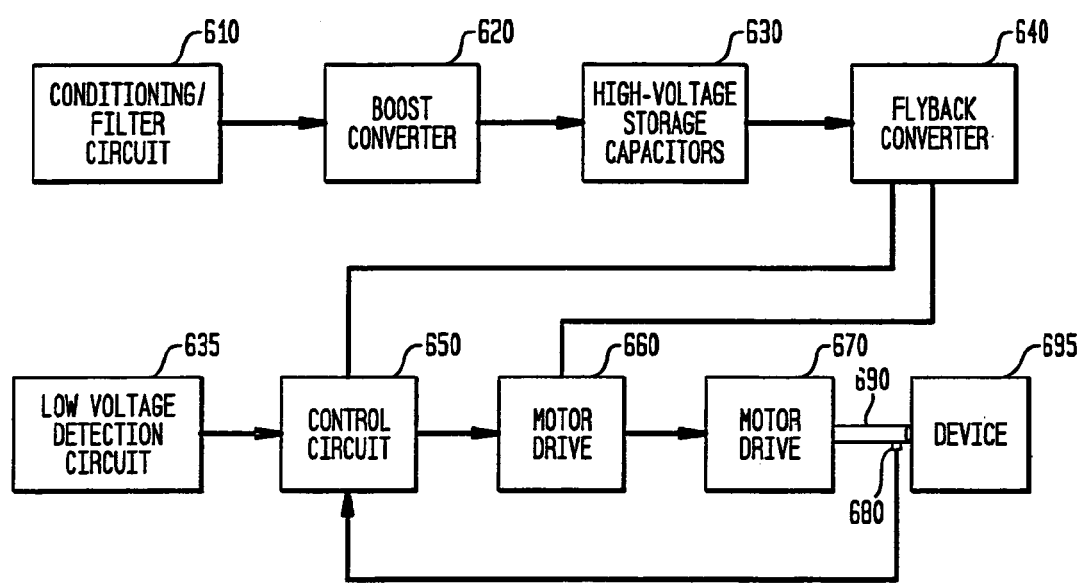
FIG. 6 is a block diagram of the present invention.

FIG. 4 is a schematic diagram of a fly-back circuit 400 for converting the 300V stored in the capacitors. 304–318 shown in FIG. 3 to provide power to both the motor and a processor for controlling the motor, shown in FIG. 6. Similar to the circuit shown in FIG. 3, circuit 400 is provided with a pulse width modulation regulator 402. Circuit 400 is provided with a transformer 404 for converting the 300V input from circuit 300 to 24V to be provided to the motor and to 5V to be provided for the microprocessor which is used to control the motor.

In operation, on the first half of a cycle, energy is stored in the transformer 404 by passing current through the primary of transformer 404. Transistor 440 is turned on and current begins to increase linearly through the primary of transformer 404. As regulator 402 is a current mode controller, when the current reaches a predetermined level the cycle ends. During the first half of the cycle the output diodes 406, 408 are reverse biased and no current flows through them. Resistor 407 and capacitor 407a are provided across output diode 406 to reduce noise. Resistor 409 and capacitor 409a are provided across output diode 408 for the same reason. When transistor 404 turns off, at the end of the first half of the cycle, voltage polarity on the secondary of transformer 404 reverses and the output diodes 406, 408 begin to conduct. Current through the diodes 406, 408 charge the output capacitors 410 and 412. Capacitor 414 is in parallel with capacitor 412 and is intended to bypass any high frequencies. When the voltage across the capacitors 410, 412 reach a predetermined level, the cycles become shorter so as to limit the amount of energy transferred. In this way the output voltage is regulated. The 300V to 24V conversion is accomplished by the turns ratio of the transformer 404 along with the duty cycle, controlled by transistor 440, which limits the amount of energy transferred each cycle.

Regulator 402 is powered by the transformer 404 through circuit 416 which is comprised of diodes 418, 420 and capacitors 422, 424. The winding of the transformer 404 is provided to supply power back to regulator 402. Diodes 418 and 420 are provided as a start up circuit. When capacitor 422 is charged up to 10V, the regulator 402 starts to run.

Turning now to the performance of the regulator 402, regulator 402 is provided to turn on and off the transistor 440, which in turns controls the duty cycle, as described above. Transistor 440 may be any type of transistor known in the art, but is preferably a MOSFET. Resistors 446 and 448 are provided as voltage dividers for the 24V input. The voltage through the voltage dividers 346 and 348 is brought through a feedback path 450. Capacitor 452 is provided to filter the voltage on the feedback path 450. By changing the on time and the off time of transistor 440, the amount of energy transferred each cycle can be controlled.

The gain of the circuits difference amplifier is set up by resistors 454 and 456. Resistor 456 defines the gain of the amplifier and the regulator 402. The clock of the regulator 402 should run at a certain rate from 20 to 100 kHz that is defined by resistor 458 and capacitor 460. Capacitor 462 is provided for filtering. Regulator 402 is preferably a current mode PWM chip, so in addition to sensing the voltage coming back through resistors 446 and 448, current is sensed through transistor 340. Resistor 26 and capacitor 366 is provided for filtering, to keep noise out of the regulator 302. Resistor 468 is provided to make the circuit more reliable and to turn MOSFET 340 off.

To protect transistor 440 when it is turned off, a snubber network comprised of diode 470, capacitor 472 and resistors 474, 476 is provided. Capacitor 478 and resistors 480 and 482 provide a similar function for the primary winding of transformer 404. Capacitor 484 is provided as additional filtering for the primary winding of transformer 404.

Transformer 404 is comprised of two secondaries. The first secondary provides 24V to the motor. The other secondary is a small path that provides 5V to the processor operation, discussed with respect to FIG. 6, through linear regulator 490. Capacitor 492 is provided to reduce noise.

Figure 5:
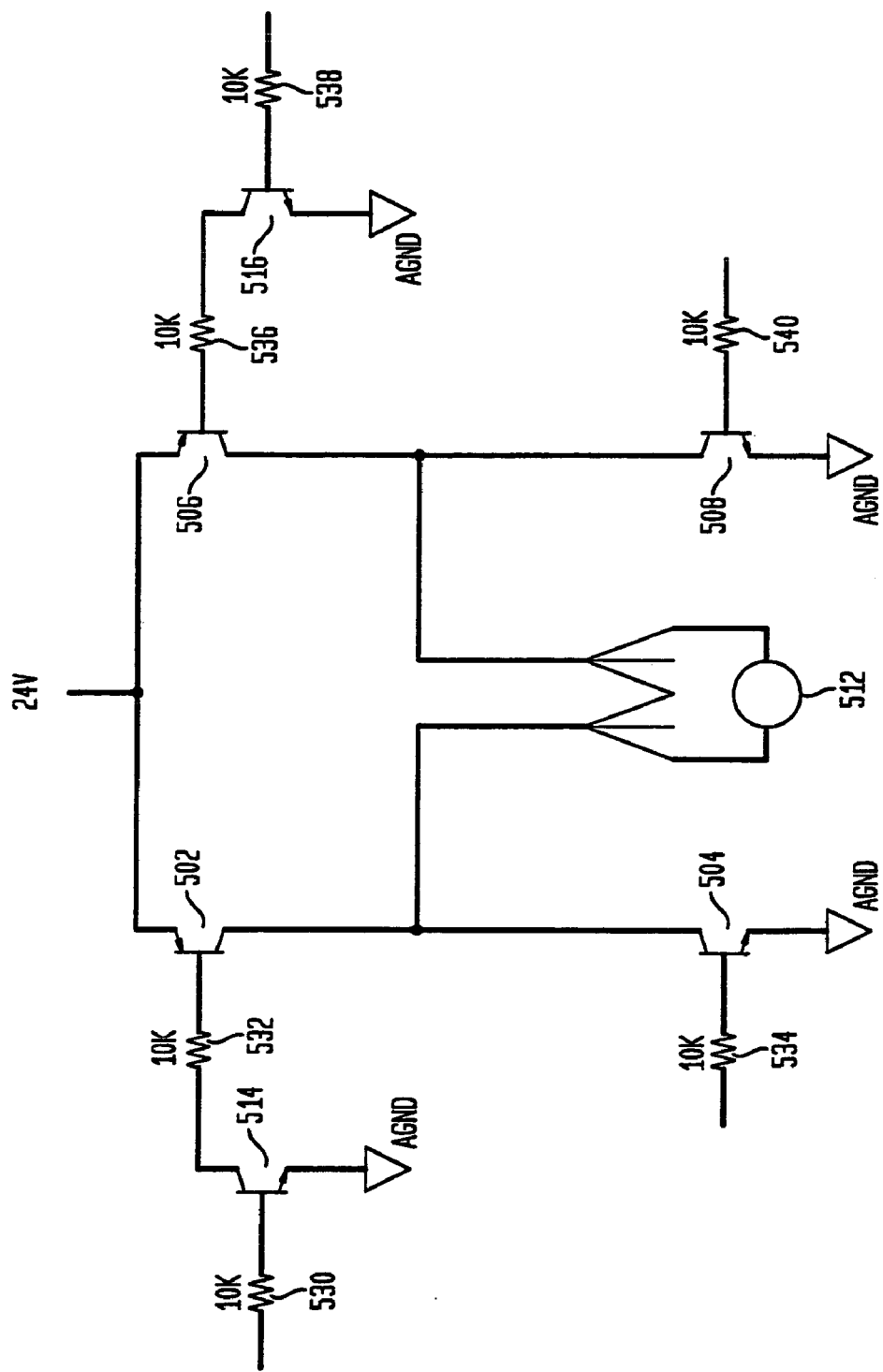
FIG. 5 is a motor drive circuit of the present invention.

FIG. 5 is a schematic diagram of the control circuit 500 for the actuator. Control circuit 500 is a motor control circuit for reversing the direction of the motor 512. 24V power is provided to circuit 500 from the circuit 400 shown in FIG. 4. Transistors 502, 504, 506 and 508 form a bridge circuit 510. Turning on transistors at opposite corners of the bridge cause the motor to run in different directions. When transistors 502 and 508 are turned on, current flows in the bridge 510 from left to right. If transistors 504 and 506 are turned on, then current flows in the bridge from right to left. In this way, the direction of the motor 512 can be reversed. Transistors 514 and 516 are provided as level shifters to turn on the top transistors of the bridge. The output from the control circuitry is referenced to ground and can go as high as 5V. Without these transistors 514 and 516 upper transistors 506 and 510 would be difficult to control. Resistors 530–540 are provided to limit base current for each of the transistors shown in FIG. 5.

The present invention can be seen in the block diagram shown in FIG. 6. The Figures referred to above are provided for exemplary purpose only, such that one of ordinary skill in the art would be able to conceive of different circuit arrangements to accomplish the functions set forth below. Conditioning circuit 610, which can be the circuit 100 shown in FIG. 1, provides some type of input rectifier and filter to convert an AC input voltage into a DC input voltage. Boost regulator circuit 620, shown in FIG. 3, boosts the DC input voltage from the conditioning circuit 610, preferably up to 300VDC, so that high voltage capacitors can be used to store energy. The capacitor bank for energy storage 630, shown as elements 304–318 in FIG. 3, is provided for storing energy for adjusting motor position in circumstances where a low voltage signal is detected from the low-voltage detection circuit 635 shown in FIG. 2. A down conversion circuit 640, such as that shown in FIG. 4, can then be used to step-down the energy stored in the high voltage capacitors in circuit 630 so that a typical voltage such as 24V may be provided to a motor drive circuit 660, such as the motor drive circuit shown in FIG. 5, when a power failure is detected by a circuit 635 such as that shown in FIG. 2. Down conversion circuit 640 also provides 5V power to the control circuit 650. Control circuit 650, which is provided with 5V power from the circuit shown in FIG. 4, is provided with a processor which is provided to control the motor drive 660, which in turn controls the motor 670. The motor 670 is operatively connected to a shaft 690 which in turn is operatively connected to a device 695, such as a valve or damper, such that the motor 670 can control the position of the device. A position sensing device 680 may be employed in proximity to the shaft 690 to relay the position of the motor 670 to the control circuit 650. The processor of the control circuit 650 can use the position of the motor 670 provided by the positioning device 680 to control the position of the device 695 when a low voltage signal is detected by the circuit 635 shown in FIG. 2. It will be appreciated that the above-described embodiments are merely exemplary, and that those of ordinary skill in the art may readily devise their own implementations and modifications that incorporate the principles of the present invention and fall within the spirit and scope thereof.

We claim:

1. A method of returning a device to a safe position using a motor in the event of a power failure, comprising:
   providing an input voltage signal;
   boosting said input signal to a higher voltage and applying said boosted signal to a plurality of storage capacitors to provide a stored voltage signal;
   converting the stored voltage signal into a smaller voltage signal, and
   applying the smaller voltage signal to said motor when a low voltage signal is detected, said motor returning said device to a predetermined safe position.

2. The method according to claim 1, wherein the input voltage signal is 24VAC.

3. The method according to claim 1, wherein the boosted signal is 300VDC.

4. The method according to claim 1, wherein said device is a damper.

5. The method according to claim 1, wherein said device is a valve.

6. The method according to claim 1, wherein said input voltage signal is rectified before being boosted.

7. The method according to claim 1, wherein said capacitors are 330 microfarad capacitors.

8. An electronic device comprising:
   a voltage input circuit, said voltage input circuit responsive to an voltage input signal;
   a booster circuit for converting said voltage input signal into a larger voltage signal;
   a capacitor storage bank including at least one capacitor for storing said larger voltage signal as a stored voltage signal; and
   a flyback circuit for converting said stored voltage signal into a smaller voltage signal to be applied to an actuator in the event of a power failure, said actuator returning a device to a predetermined safe position.

9. The electronic device according to claim 8, wherein the larger voltage signal is 300VDC.

10. The electronic device according to claim 8, wherein said device is a damper.

11. The electronic device according to claim 8, wherein said device is a valve.

12. The electronic device according to claim 8, wherein the capacitors are 330 microfarad capacitors.

* * * * *